United States Patent [19]

Goudy, Jr. et al.

[11] Patent Number: 4,687,031

[45] Date of Patent: Aug. 18, 1987

[54] VALVE CONTROL WITH MECHANICAL MEMORY

[75] Inventors: Paul R. Goudy, Jr., Bayside; William G. Weekley, Milwaukee; Donald L. Dovala, Grafton; Thomas C. Olszewski, Sr., Milwaukee, all of Wis.

[73] Assignee: Autotrol Corporation, Milwaukee, Wis.

[21] Appl. No.: 818,526

[22] Filed: Jan. 10, 1986

[51] Int. Cl.$^4$ ............................................. B65B 3/04
[52] U.S. Cl. ...................................... 141/9; 141/100; 137/412; 210/123; 210/143; 222/67; 222/133; 251/251
[58] Field of Search ........................................ 141/1-12, 141/18, 191-196, 100-110; 210/143, 123, 138, 169, 754, 141, 142; 222/52, 63, 129.3, 11, 56, 64, 67, 640, 639, 641, 643, 638, 644, 133; 137/412, 624.11, 624.22; 251/251, 129.01, 129.11, 129.12; 221/15, 96

[56] References Cited

U.S. PATENT DOCUMENTS 3,638,392  2/1972  Welker et al. .................... 141/104

OTHER PUBLICATIONS

"300 Series Programming Control Valve", Autotrol Corporation, R-202.
"Exploded View & Parts List, 300 Series Programming Control Valve", Form R-210-4/82.

*Primary Examiner*—Houston S. Bell, Jr.
*Attorney, Agent, or Firm*—Quarles & Brady

[57] ABSTRACT

A pair of flapper valves are mounted in parallel to control the flow of a fluid into a reservoir. The flapper valves are opened by a first rotatable cam which is rotated through one or more complete revolutions when a float control switch in the reservoir is opened thereby indicating a drop in the level of fluid in the reservoir. Each complete revolution of the first cam actuates an impulse switch for a short duration. The impulse switch energizes a low speed memory motor and increments the output shaft of the motor. Each increment corresponds to one complete revolution of the first cam and, therefore, one unit of a fixed quantity of fluid passing through the valves. The output shaft of the memory motor rotates a second adjustable cam that controls the actuation of a switch which in turn controls a dispenser for dispensing a chemical additive into the fluid added to the reservoir.

15 Claims, 6 Drawing Figures

VALVE CONTROL WITH MECHANICAL MEMORY

BACKGROUND OF THE INVENTION

This invention relates to controlling a valve that discharges a fluid while dispensing a dosage of an additive to the fluid in proportion to the quantity of fluid. The invention particularly relates to a method and apparatus that utilize a mechanical memory for accumulating information as to the quantity of the fluid and using that accumulated information to trigger the dispensing of the additive.

There are many situations in which it is necessary to dispense a controlled dosage of an additive into a quantity of a fluid in preset proportions. One such situation involves roof top water reservoirs that are used to provide a desired water pressure within a building. The contents of the reservoirs are typically open to the atmosphere to prevent creation of a vacuum in the reservoir. However, the fact that they are open to the atmosphere makes the water susceptible to bacteria and algae growth. This problem is typically eliminated by the regular addition of a controlled quantity of a bactericidal chemical such as chlorine to the water.

Prior approaches to controlling the concentration of the bactericidal chemical in the water have involved measuring the flow of water added to the reservoir and dispensing an appropriate quantity of the chemical based upon the measured volume of water. However, flow measuring devices are expensive and trouble prone and are not suitable for measuring relatively small flow rates.

One more recent approach is described in commonly owned, co-pending application Ser. No. 783,297 filed Oct. 2, 1985 by Paul R. Goudy, Jr., et al. for Bactericidal Mixture Control System. In that approach, flow of the water into the reservoir is initiated by a float actuated switch and the duration of the flow is controlled. While the water flow is occuring, a dispenser dispenses chemical into the reservoir according to a preset dispensing cycle which is initiated when the water flow is initiated and also terminates when the water flow terminates.

The present invention represents an approach for controlling the concentration of an additive into a fluid, such as water in an open reservoir, by controlling the duration during which valves are open to discharge the fluid into the reservoir and by accumulating information concerning the duration of discharge in a simple but efficient mechanical memory which triggers the dispensing of the additive into the fluid in the reservoir in preselected proportions to the amount of fluid added to the reservoir.

SUMMARY OF THE INVENTION

In accordance with the invention, a control provides a signal, the frequency of which is proportional to the quantity of a fluid discharged through a valve, which control includes a first rotatable cam having a first cam surface that engages a valve actuator to open the valve, means for rotating the cam at a constant speed through one or more complete revolutions, a low speed motor having an output shaft mounting a second cam, an impulse switch having an actuator engaged by a second cam surface of the first cam, such impulse switch being actuated during a small portion of each complete revolution of the first cam so as to energize the low speed motor while the impulse switch is actuated, and a switch actuated by the second cam to provide the signal.

More specifically, the control is adapted to control a valve that discharges a fluid into a reservoir and for also controlling a chemical dispenser for admitting a dosage of a chemical additive into the reservoir. The means for rotating the first cam may be responsive to the actuation of a float switch disposed in the reservoir and which is actuated when the fluid in the reservoir falls below a preselected level. Further, the signal can directly control the operation of the chemical dispenser apparatus.

The invention further resides in a method for dispensing a dosage of a chemical additive in proportion to the quantity of a fluid added to a reservoir, which method comprises the steps of discharging successive units of a fixed quantity of the fluid into the reservoir, providing a short energizing pulse to a low speed motor for each unit of the fixed quantity of fluid discharged, rotating a cam by the motor one increment for each pulse to the motor, and actuating a switch by the cam to control the dispensing of a dosage of the chemical additive after a portion of a complete revolution of the cam.

In the preferred embodiment, the control includes a timer motor that drives a cam shaft through a gear train. The cam shaft mounts a first cam which has two slightly out of phase cam surfaces each of which controls a flapper valve. The two flapper valves are mounted in parallel and together admit a fixed quantity of a fluid into the reservoir for each full rotation of the first cam. The first cam also includes an adjustable switch cam surface that actuates an impulse switch which completes a circuit to energize a second low speed motor which in turn rotates an adjustable dispensing cam. The dispensing cam has a cam surface that actuates a dispensing switch which controls the dispensing of a chemical additive to the fluid in an controlled but adjustable proportion to the quantity of fluid admitted through the two flapper valves. The entire sequence for the metering of the fluid through the two flapper valves and the dispensing of the chemical additive is initiated by a float control switch disposed in the reservoir.

It is a principal object of the invention to provide a simple but efficient method and control for dispensing a dosage of an additive into a fluid in proportion to the quantity of fluid.

It is another object of the invention to provide such a control which will retain a memory of the amount of fluid added between doses even though there is a loss of power.

The foregoing and other objects and advantages of the invention will appear in the detailed description which follows. In the description reference is made to the accompanying drawings which illustrate a preferred embodiment of the invention.

DETAILED DESCRIPTION OF THE PREFERRED EMBODIMENT

Figure 1:
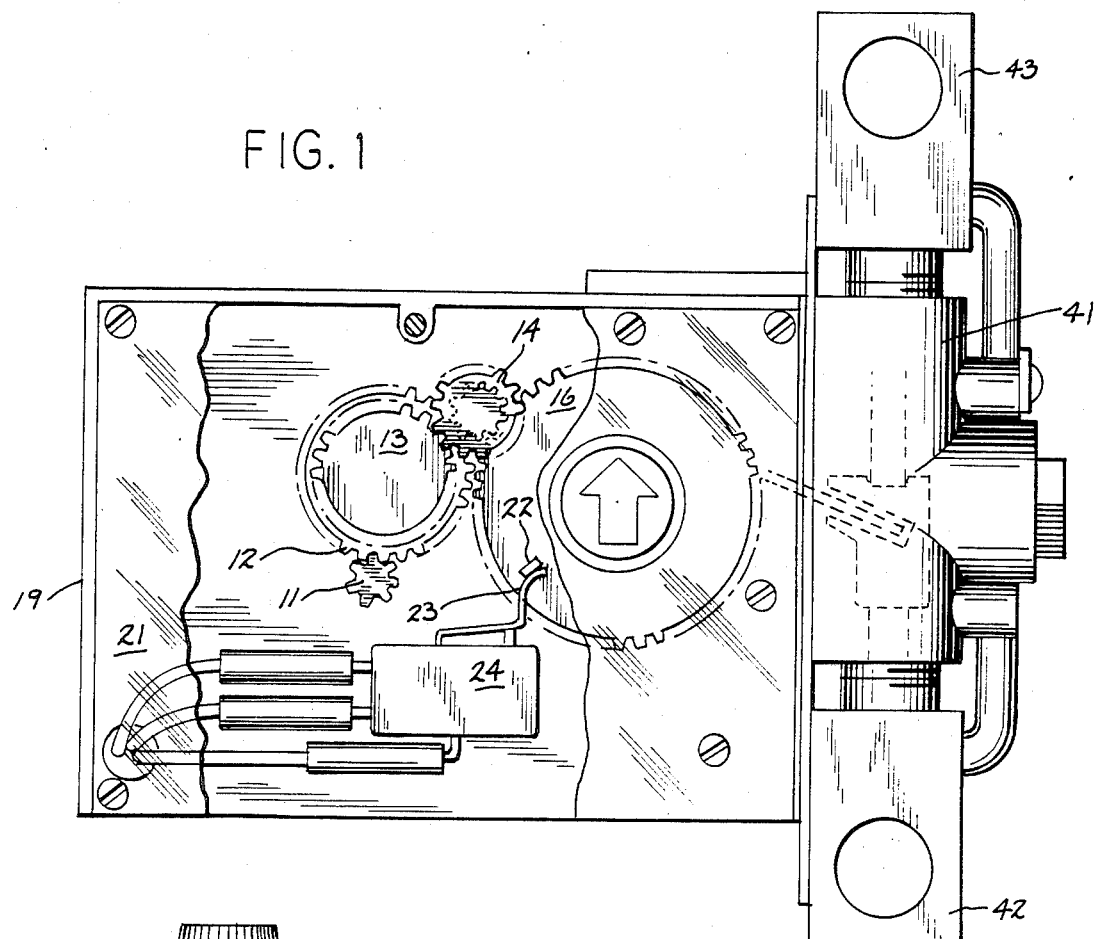
FIG. 1 is a front view in elevation of an impulse timer valve that incorporates the control in accordance with the invention.
Figure 2:
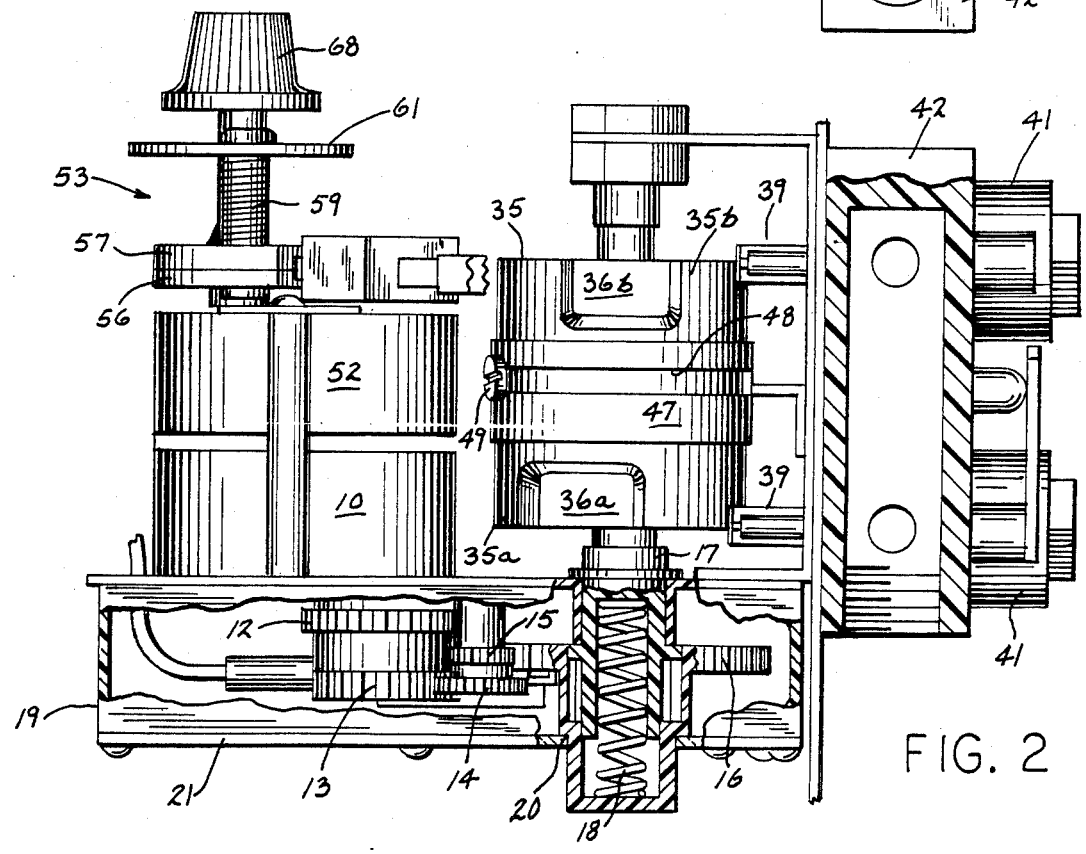
FIG. 2 is a side view of the valve of FIG. 1 with portions broken away and in section for pupeses of illustration.

Referring to the drawings, a timer motor 10 has internal speed reduction gearing that drives an output shaft which mounts a drive pinion 11. The drive pinion 11 meshes with a gear 12 mounted on a common shaft with a second gear 13 which meshes with a third gear 14 that is mounted on a common shaft with another pinion 15 that can mesh with a cam gear 16. The cam gear 16 is splined on a cam shaft 17 and is urged by a spring 18 to a position in which it meshes with the second pinion 15 (see FIG. 2). As shown in FIGS. 1 and 2, the gear train is mounted within a housing 19 and the cam gear 16 has a shoulder 20 that bears against the inside of the front wall 21 of the housing 19 under the urging of the spring 18. The cam gear 16 has a projection 22 that is positioned to engage the actuator 23 of a timer motor switch 24 that is also mounted within the housing 19.

Figure 6:
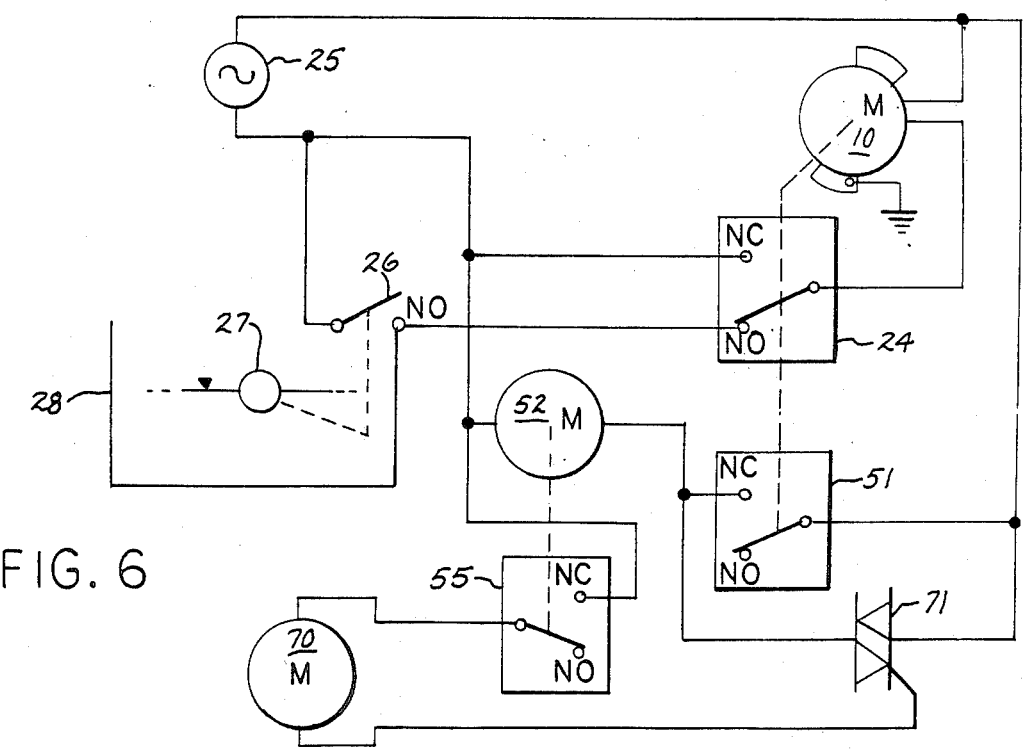
FIG. 6 is a schematic circuit diagram of the valve control including its motors and switches.

As seen in FIG. 6, the timer motor switch 24 operates to connect the timer motor 10 across a single phase a.c. source 25. When the projection 22 of the cam gear 16 engages the actuator 23 of the timer motor switch 24, the switch 24 connects the motor to the source 25 through normally open contacts and through a normally open float switch 26 that is actuated by a float 27 in a reservoir 28. Whenever the water level in the reservoir 28 falls below a preselected level, as when a certain quantity of water is withdrawn from the reservoir, the float switch 26 will close and the timer motor 10 will be energized. When the projection 22 clears the switch actuator 23 (after about twenty-five seconds of a total of about fourteen minutes for one revolution of the cam gear 16), the switch 24 will connect the timer motor 10 directly to the source 25 through the normally closed contacts. The timer motor 10 will remain energized while the cam gear 16 completes one full revolution and until the projection 22 again engages the actuator 23 to move the switch 24 to its normally open contacts. If the float switch 26 is then open, the timer motor 10 will cease rotating the cam gear 16. If the float switch 26 is still closed, the timer motor 10 will remain energized and cause the cam gear 16 to complete another full revolution. In this manner, the timer motor 10 is caused to rotate the cam gear 16 through one or more complete revolutions initiated by the float switch 26.

The cam shaft 17 is connected to a circular cylindrical cam 35 that has a pair of cam surfaces 35a and 35b at opposite ends. The cam surfaces are interrupted by respective depressions 36a and 36b. The lever arm actuators 37 of a pair of flapper valves 38 ride the cam surfaces 35a and 35b and are assisted into engagement therewith by leaf springs 39. The principal function of the leaf springs 39 is to assist in closing the flapper valves 38. The flapper valves 38 close against respective valve seats 40 in a pair of valve bodies 41 that are connected in parallel between an inlet manifold 42 and an outlet manifold 43. When cam gear 16 and cam 35 are at rest, the flapper valve lever arms 37 are disposed in the depressions 36a and 36b and the flapper valves 38 are both closed. When the cam 35 is rotated by the timer motor 10 through the gear train, first one and then the other of the flapper valve lever arms 37 will ride out of the respective depression and then along the respective cam surface to open its valve. The depressions 36a and 36b are slightly staggered so that both flapper valves are not forced to open at the same time against a fluid head. The inlet manifold 42 is connected to a source of fluid under pressure and the outlet manifold leads to the reservoir 28.

Two flapper valves 38 in parallel are used because a more accurate control over the water flow is attainable using two relatively small orifices rather than one large orifice. If very large flow rates are required, the control may open a single valve that is connected to pilot a large supply valve.

Figure 3:
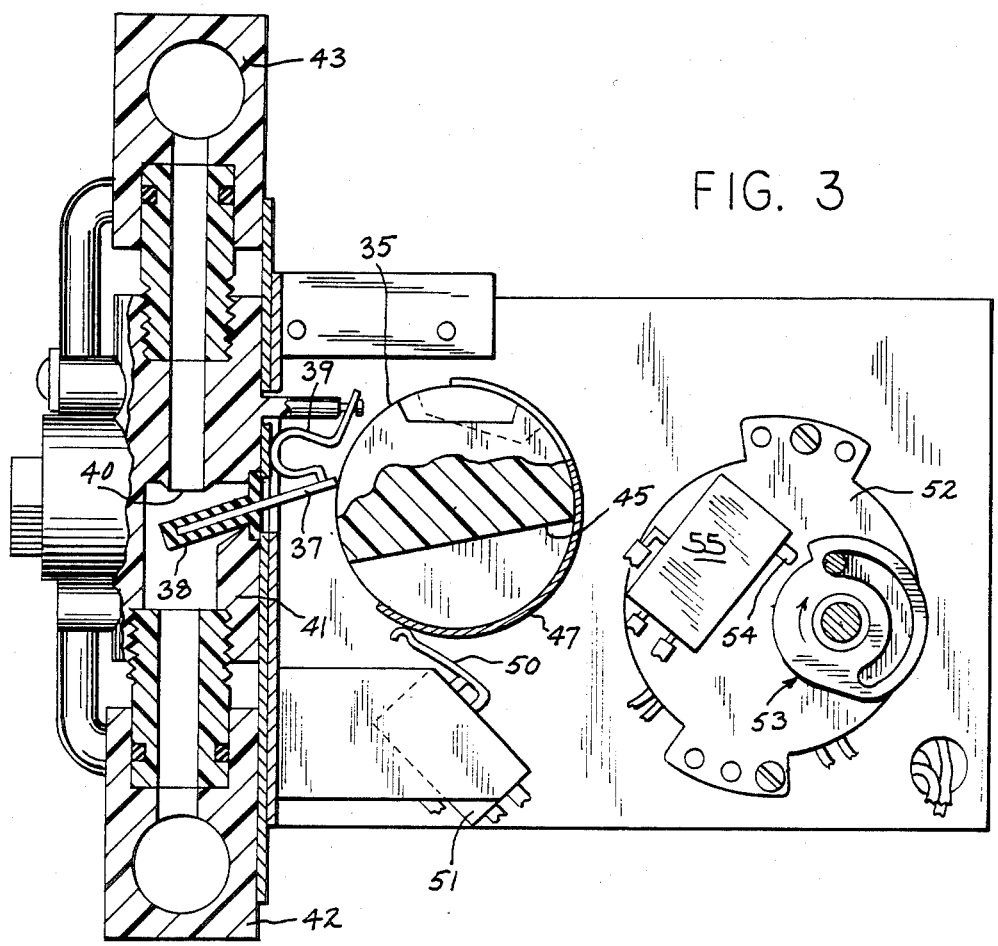
FIG. 3 is a rear view in elevation of the valve with portions broken away and in section for purposes of illustration.
Figure 4:
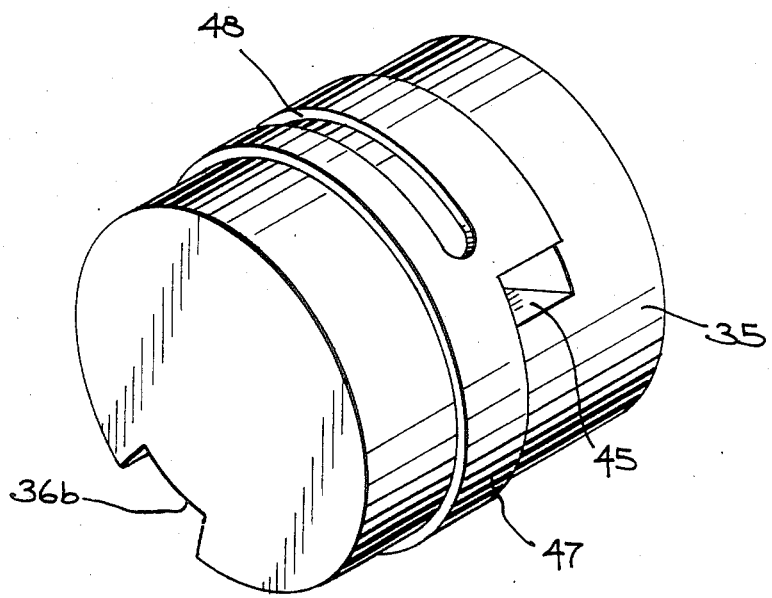
FIG. 4 is a view in perspective of a first adjustable cam used in the valve control.

The middle of the cam 35 also forms a central cam surface that is defined by a central recess 45, which removes about forty percent of the circumference of the cam, and by a metal hoop 47 that has a central elongated slot 48 which receives a screw 49 threated into the cam 35. The length of the central cam surface can be adjusted by rotating the hoop 47 on the cam 35 to diminish the size of the recess 45 that is exposed at the surface of the cam 35 (see FIGS. 3 and 4). The central cam surface controls a switch actuator 50 of an impulse switch 51 that controls the energization of a low speed memory motor 52.

The memory motor 52 is similar to the timer motor 10 including having an internal gear reduction, but it has a very low output speed, such as 1/5 or 1/6 rpm. The output shaft of the memory motor mounts a second adjustable cam assembly 53 that has an adjustable cam surface that engages the actuator 54 of a dispenser switch 55.

Figure 5:
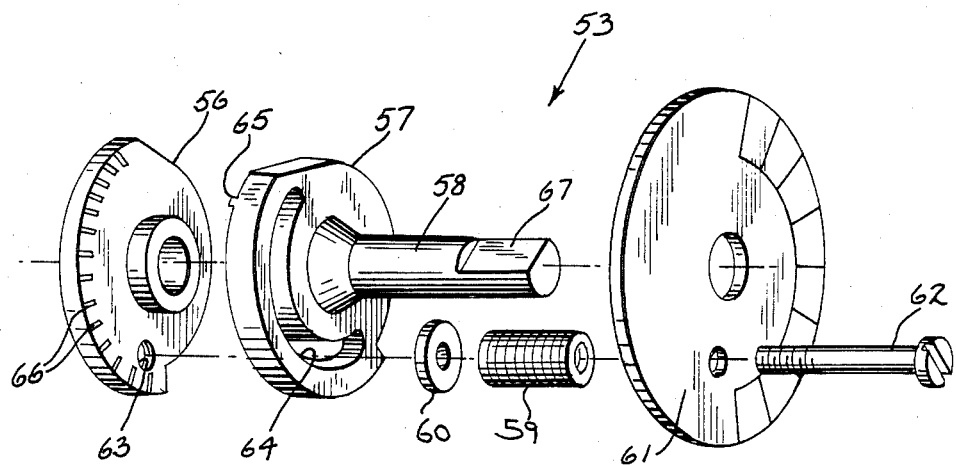
FIG. 5 is an exploded view in perspective of a second adjustable cam assembly that forms a portion of the valve control.

The details of the second cam assembly 53 are illustrated in FIG. 5. The output shaft of the memory motor mounts 52 a first cam plate 56. A second independent cam plate 57, from which extends a knob shaft 58, is in frictional contact with the cam plate 56. The second cam plate 57 is biased against the first cam plate 56 by means of a spring 59 that engages a washer 60, the spring 59 being retained between a dial plate 61 and the washer 60. A bolt 62 extends through the dial plate 61 as well as the second cam plate 57 and is received in a threaded opening 63 in the first cam plate 56.

An arcuate groove 64 extends through the second cam plate 57, which also has a projection 65 extending therefrom which will selectively engage radial notches 66 in the first cam plate 56. The knob shaft 58 has a flat section 67 to receive a knob 68, in the usual manner. The second cam assembly 53 is similar to an adjustable cam assembly shown and described in commonly owned, co-pending U.S. application Ser. No. 656,176, filed Sept. 28, 1984, now U.S. Pat. No. 4,662,538, by Paul R. Goudy, Jr., et al. for Bactericidal Pellet Dispenser.

The first and second cam plates 56 and 57 each have an eccentric cam surface along their respective peripheries. By adjusting the relative angular position of the two cam plates, and retaining that position by tightening the bolt 62, the length of the effective cam surface can be increased.

As shown in FIG. 6, when the dispenser switch 55 is actuated, it will complete a circuit from the source 25 to one side of the drive motor 70 of a chemical dispenser. The other side of the dispenser motor 70 is connected to the gate terminal of a Triac 71 whose main terminals are connected in parallel with the impulse switch 51. The dispenser may take the form of a pellet dispenser of the type shown and described in the aforementioned application Ser. No. 656,176, (now U.S. Pat. No. 4,662,538).

The operation of the control will now be described assuming that the reservoir 28 is a roof top water reservoir and that the dispenser motor 70 operates a pellet dispenser for pellets of a bactericide such as chlorine for treatment of the water. As water is removed from the reservoir, the water level will fall. This falling water level will be sensed by the float 27 with the result that the float switch 26 will close. As soon as the float valve 26 closes, a circuit is completed to the timer motor 10 which will cause the motor to begin to rotate. As explained previously, once rotation of the timer motor 10 has commenced, it will continue to be energized through one full and complete revolution of the cam gear 16 even if the float switch 26 opens. This will result in one complete revolution of the cam 35 and the opening of both flapper valves 38 to admit a quantity of water into the reservoir. The quantity of water admitted is dependent upon the duration of rotation of the cam 35, which is being rotated at a constant speed, and the pressure of the water in the feed line leading to the inlet manifold 42. That quantity is fixed and determinable.

After the cam gear 16 has completed one revolution, the timer motor 10 will stop unless the float switch 26 remains closed in which case the motor will continue to drive the cam gear 16 through another revolution. In this manner units of a fixed quantity of water are successively discharged into the reservoir through the flapper valve 38 until the quantity of water that has been withdrawn from the reservoir is replaced and the float 27 rises to a level there the float switch 26 is open.

Each revolution of the cam 35 also results in the actuation of the impulse switch 51 and the energization of the memory motor 52 for a short duration. Each energization will cause the memory motor 52 to rotate its output shaft through a small increment of one revolution. Each increment of revolution is therefore proportional to one unit of the fixed quantity of water. Depending upon the adjustment of the second adjustable cam assembly 53, a certain preselected number of increments of rotation of the output shaft of the memory motor 52 will actuate the dispensing switch 55 and thereby produce a signal that the dispensing of the chemical additive should begin. This is accomplished specifically by energizing the dispenser motor 70 to dispense one or more pellets depending upon the cycle of operation of the dispenser.

Once the dispensing switch 55 has been actuated and the dispenser motor 70 energized, the Triac 71 will maintain the memory motor 52 energized even though the impulse switch 51 returns to its normally open condition as would occur when the cam gear 16 completes a revolution and stops. Thus, the dispensing of the chemical additive will be carried out completely once it is signaled by the closing of the dispenser switch 55 even if the flow of water to the reservoir has already stopped.

The number of doses in relation to the number of units of fixed quantity of water added to the reservoir can be varied. A gross adjustment is obtained by adjusting the central cam surface of the cam 35 by moving the hoop 48 to vary the exposed extent of the recess 45. A fine adjustment is accomplished by adjusting the length of the cam surface on the second adjustable cam 53. In one embodiment which employs a 1/6 rpm memory motor 52, the lowest concentration of additive would provide one dose of the chemical additive for each eighteen openings of the flapper valve, while maximum dosage could be achieved in the same embodiment by suitable adjustments and described above so that one dose would result for each two openings of the flapper valves.

Should power be lost at any time to the control, the memory motor 52 will retain the accumulated rotational position of its output shaft, and therefore of the cam assembly 53, that reflects the number of units of water which have already been discharged into the reservoir. There is no need for a battery back-up to store this accumulated memory. As soon as power is returned, the control will resume discharging units of water into the reservoir and the new units of water will be added to those previously discharged in the combined position of the adjustable cam 53 so that a proper dosage of chemical additives will be achieved. An operational problem could occur if power were lost while the flapper valves 38 were open. The additional water would not be recorded in the position of the memory motor 52. This problem can be solved by providing a solenoid controlled valve down stream of the flapper valves 38 which would automatically close upon the loss of power.

We claim:

1. A control for providing a signal, the frequency of which is proportional to the quantity of a fluid discharged through a valve having a valve actuator, comprising:
   a first rotatable cam having a first cam surface that engages the valve actuator to open the valve;
   means for rotating the first cam at a constant speed through one or more complete revolutions;
   a low speed motor having an output shaft mounting a second cam;
   an impulse switch having an actuator engaged by a second cam surface of the first cam, said impulse switch being actuated during a small portion of each complete revolution of the first cam to energize the low speed motor while the impulse switch is energized; and
   a further switch actuated by the second cam to provide the signal.

2. A control in accordance with claim 1 wherein said second cam surface of said first cam is adjustable to vary the duration of the portion of each complete revolution of the first cam during which the impulse switch is actuated.

3. A control in accordance with claim 1 wherein said second cam has a cam surface that is adjustable to vary the number of complete revolutions of the first cam needed before the further switch is actuated by the second cam.

4. A control for controlling a valve having a valve actuator to discharge a fluid into a reservoir and for controlling a chemical dispenser for admitting a dosage of a chemical treatment in proportion to the quantity of fluid discharged into the reservoir, comprising;
   a first rotatable cam having a first cam surface that engages the actuator for the valve to open the valve;
   means responsive to a signal for initiating the discharge of the fluid into the reservoir and operative to rotate the first cam at a constant speed through one or more complete revolutions while the signal is present;

a low speed motor having an output shaft mounting a second cam;

an impulse switch having an actuator engaged by a second cam surface of the first cam, said impulse switch being actuated during a small portion of each complete revolution of the first cam and connected to energize the low speed motor while the impulse switch is actuated; and a dispenser switch actuated by the second cam and controlling the operation of the chemical dispenser.

5. A control in accordance with claim 4 together with a float switch in the reservoir that is actuated when the fluid in the reservoir is below a preselected level to provide the signal for initiating the discharge of the fluid into the reservoir.

6. A control in accordance with claim 4 wherein the means responsive to the signal comprises:

a second motor connected by gearing to the first cam and being energized while the signal is present, and means for maintaining the second motor energized through a complete rotation of the first cam.

7. A control for controlling a valve having a valve actuator to discharge a fluid into a reservoir and for controlling a chemical dispenser for admitting a dosage of a chemical treatment in proportion to the quantity of fluid discharged into the reservoir, comprising:

a float switch in the reservoir that is actuated when the fluid in the reservoir is below a preselected level;

a cam shaft mounting a first rotatable cam having a first cam surface that engages an actuator for the valve to open the valve;

means responsive to the actuation of the float switch to rotate the cam shaft at a constant speed through one or more complete revolutions while the float switch is actuated;

a low speed motor having an output shaft mounting a second cam;

an impulse switch having an actuator engaged by a second cam surface of the first cam, said impulse switch being actuated during a small portion of each complete revolution of the first cam and connected to energize the low speed motor while the impulse switch is actuated so as to rotate the output shaft through a discreet increment for each actuation of the impulse switch; and a dispenser switch actuated by the second cam for controlling the operation of the chemical dispenser.

8. A control in accordance with claim 7 wherein the means responsive to the actuation of the float switch comprises:

a second motor connected by gearing to the cam shaft and being energized by the actuation of the float switch, and means for maintaining the second motor energized through a complete rotation of the cam shaft.

9. A control in accordance with claim 8 wherein said second cam surface of said first cam is adjustable to vary the duration of the portion of each complete revolution of the first cam during which the impulse switch is actuated.

10. A control in accordance with claim 8 wherein said second cam has a cam surface that is adjustable to vary the number of rotational increments of the output shaft of the low speed motor necessary before the dispenser switch is actuated.

11. A control in accordance with claim 8 together with means responsive to the actuation of the dispenser switch to continue the energization of the low speed motor until the dispenser switch is deactuated.

12. A method of dispensing a dosage of a chemical additive in proportion to the quantity of a fluid added to a reservoir, comprising:

discharging successive units of a fixed quantity of the fluid into the reservoir;

providing a short energizing pulse to a low speed motor for each unit of the fixed quantity of fluid discharged;

rotating a cam by the motor one increment for each pulse to the motor; and actuating a switch that dispenses a dosage during a portion of a complete revolution of the cam.

13. A method in accordance with claim 12 together with the step of continuously rotating the cam while the switch is actuated.

14. A method in accordance with claim 12 together with the steps of adjusting the duration of the energizing pulse and the extent of the portion of a complete revolution of the cam to vary the proportion of the chemical additive relative to the fluid quantity.

15. A valve for controlling the flow of a fluid, comprising;

a fluid inlet manifold;

a fluid outlet manifold;

a pair of valves connected in parallel between the inlet and outlet manifolds, each of said valves having a valve actuator;

a first rotatable cam having a pair of first cam surfaces each engaging one of the valve actuators to open the valves;

means for rotating the first cam at a constant speed through one or more complete revolutions;

a low speed motor having an output shaft mounting a second cam;

an impulse switch having an actuator engaged by a second cam surface of the first cam, said impulse switch being actuated during a small portion of each complete revolution of the first cam to energize the low speed motor while the impulse switch is energized; and a further switch actuated by the second cam to provide a signal the frequency of which is proportional to the quantity of fluid flowing through the two valves.

* * * * *